United States Patent
Gyllenskog

(10) Patent No.: US 12,517,666 B2
(45) Date of Patent: Jan. 6, 2026

(54) TECHNIQUES TO CONFIGURE ZONAL ARCHITECTURES OF MEMORY SYSTEMS

(71) Applicant: Micron Technology, Inc., Boise, ID (US)

(72) Inventor: Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/581,253

(22) Filed: Feb. 19, 2024

(65) Prior Publication Data

US 2024/0281156 A1    Aug. 22, 2024

Related U.S. Application Data

(60) Provisional application No. 63/447,552, filed on Feb. 22, 2023.

(51) Int. Cl.
*G06F 3/06* (2006.01)

(52) U.S. Cl.
CPC .......... *G06F 3/0629* (2013.01); *G06F 3/0604* (2013.01); *G06F 3/0652* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 2014/0201423 A1* | 7/2014 | Jean | G06F 12/0246 711/103 |
| 2016/0299689 A1* | 10/2016 | Kim | G06F 3/0688 |
| 2017/0300422 A1* | 10/2017 | Szubbocsev | G06F 12/1009 |
| 2019/0332298 A1* | 10/2019 | Madabhushi | G06F 3/0679 |
| 2021/0374067 A1* | 12/2021 | Helmick | G06F 11/1048 |
| 2022/0113885 A1* | 4/2022 | Jeon | G06F 12/0246 |
| 2022/0300431 A1* | 9/2022 | Subbarao | G06F 12/0866 |
| 2023/0317182 A1* | 10/2023 | Madraswala | G11C 16/3459 |
| 2024/0143211 A1* | 5/2024 | Na | G06F 3/0644 |

* cited by examiner

*Primary Examiner* — Yaima Rigol
*Assistant Examiner* — Elias Young Kim
(74) *Attorney, Agent, or Firm* — Holland & Hart LLP

(57) ABSTRACT

Methods, systems, and devices for techniques to configure zonal architectures of memory systems are described. In some cases, a host system may control characteristics of zones of a memory system. For example, the host system may transmit a command to the memory system to configure a zone according to a parameter. The parameter may indicate the quantity of bits per cell in memory cells within a zone. In some examples, the parameter may include one or more bits indicating the quantity. Upon receiving the command, the memory system may configure the zone in accordance with the parameter. In some examples, the memory system may provide a mapping to the host system indicating the quantity of addresses that a zone may store for each memory cell type.

17 Claims, 4 Drawing Sheets

TECHNIQUES TO CONFIGURE ZONAL ARCHITECTURES OF MEMORY SYSTEMS

CROSS REFERENCE

The present Application for Patent claims priority to U.S. Patent Application No. 63/447,552 by Gyllenskog, entitled "TECHNIQUES TO CONFIGURE ZONAL ARCHITECTURES OF MEMORY SYSTEMS," filed Feb. 22, 2023, which is assigned to the assignee hereof, and which is expressly incorporated by reference in its entirety herein.

FIELD OF TECHNOLOGY

The following relates to one or more systems for memory, including techniques to configure zonal architectures of memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

In some cases, storage locations within a memory system may be divided into zones, where each zone may contain a plurality of memory cells with corresponding logical block addresses (LBAs). The memory cells within a zone may be configured to store one or more bits. For example, a zone may include single-level cells (SLCs) storing one bit per cell, multi-level cells (MLCs) storing two bits per cell, triple-level cells (TLCs) storing three bits per cell, or quad-level cells (QLCs) storing four bits per cell. In some cases, zones having memory cells storing different quantities of bits may have different characteristics. For example, a QLC zone may have and greater storage density than an SLC zone, but may also be associated with decreased performance, such as slower write times, slower read times, and reduced endurance. Accordingly, techniques to efficiently manage zonal architectures may be desired.

As described herein, a host system may control characteristics of zones of a memory system. For example, the host system may transmit a command to the memory system to configure a zone according to a parameter. The parameter may indicate the quantity of bits per cell in memory cells within a zone (e.g., may indicate whether to configure the zone as an SLC zone, an MLC zone, a TLC zone, or a QLC zone). In some examples, the parameter may include one or more bits indicating the quantity (e.g., '00' may correspond to SLC, '01' may correspond to MLC, '10' may correspond to TLC, and '11' may correspond to QLC). Upon receiving the command, the memory system may configure the zone in accordance with the parameter. In some examples, the memory system may provide a mapping to the host system indicating the quantity of addresses that a zone may store for each memory cell type. Such techniques may allow greater control and flexibility of the host system over the memory system. For example, the described techniques may allow the host system to dynamically modify the storage density of the memory system, may allow the host system to increase the effective performance speed of the memory system, or both.

Figure 1:
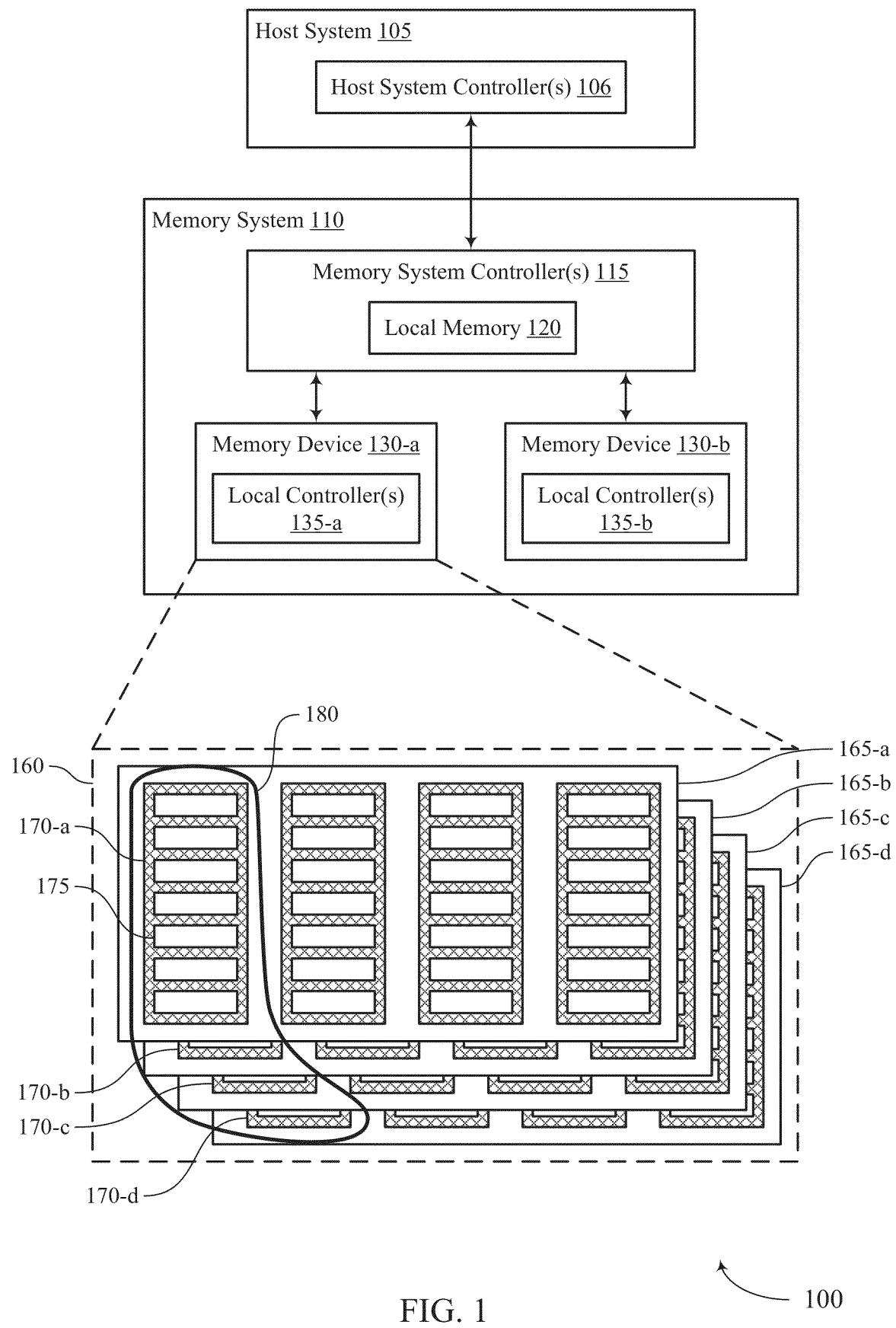
FIG. 1 illustrates an example of a system that supports techniques to configure zonal architectures of memory systems in accordance with examples as disclosed herein.

Features of the disclosure are initially described in the context of systems, devices, and circuits with reference to FIG. 1. Features of the disclosure are described in the context of a process flow with reference to FIG. 2. These and other features of the disclosure are further illustrated by and described in the context of an apparatus diagram and flowchart that relate to techniques to configure zonal architectures of memory systems with reference to FIGS. 3 through 4.

FIG. 1 illustrates an example of a system 100 that supports techniques to configure zonal architectures of memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and one or more storage protocol controllers (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently crased (e.g., crased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques to configure zonal architectures of memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, a host system 105 may control characteristics of zones of a memory system 110. For example, the host system 105 may transmit a command to the memory system to configure a zone according to a parameter. The parameter may indicate the quantity of bits per cell in memory cells within a zone (e.g., may indicate whether to configure the zone as an SLC zone, an MLC zone, a TLC zone, or a QLC zone). In some examples, the parameter may include one or more bits indicating the quantity (e.g., '00' may correspond to SLC, '01' may correspond to MLC, '10' may correspond to TLC, and '11' may correspond to QLC). Upon receiving the command, the memory system 110 may configure the zone in accordance with the parameter. In some examples, the memory system 110 may provide a mapping to the host system 105 indicating the quantity of addresses that a zone may store for each memory cell type. Such techniques may allow greater control and flexibility of the host system 105 over the memory system 110. For example, the described techniques may allow the host system 105 to dynamically modify the storage density of the memory system 110, may allow the host system 105 to increase the effective performance speed of the memory system 110, or both.

Figure 2:
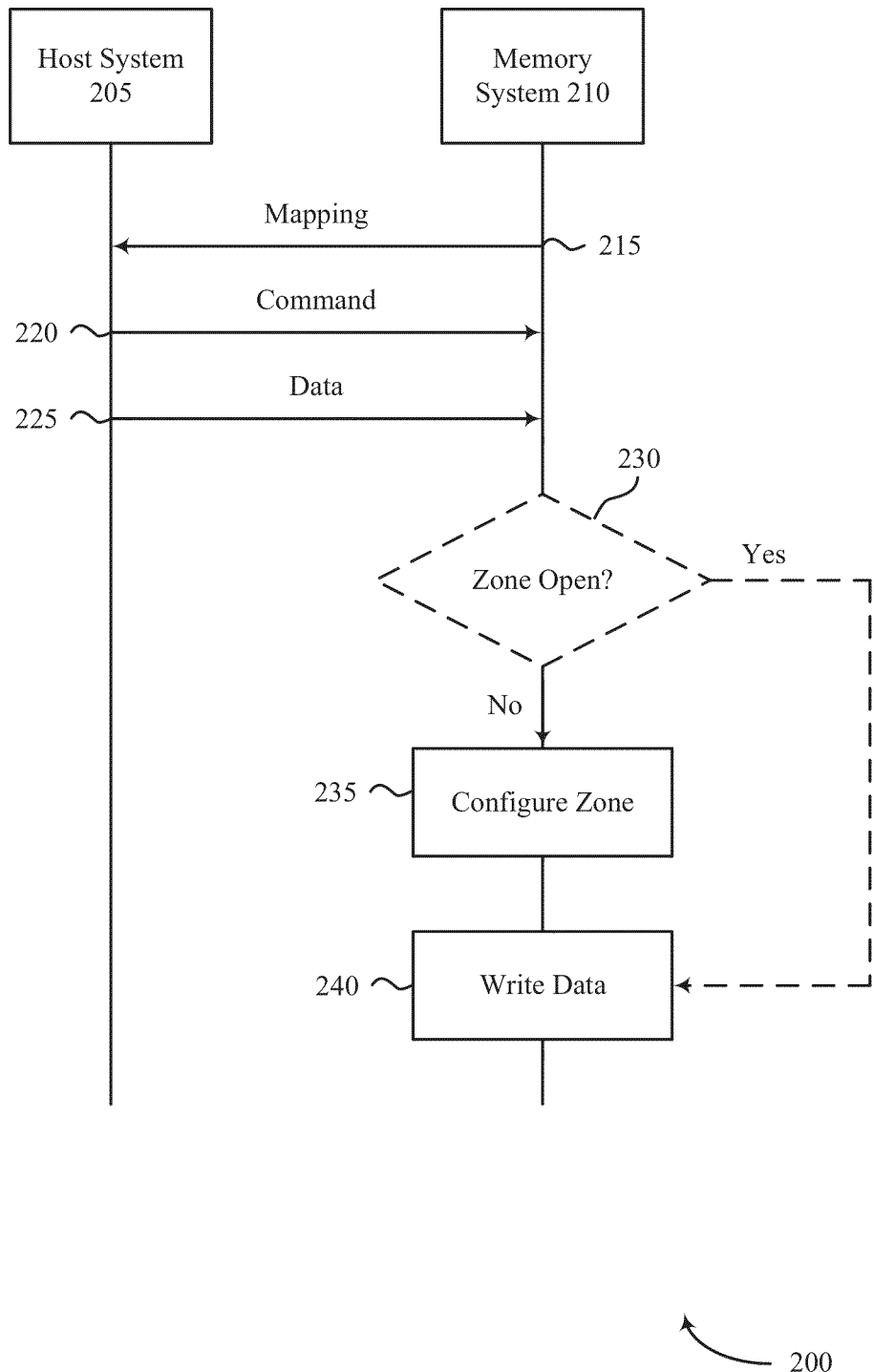
FIG. 2 illustrates an example of a process flow that supports techniques to configure zonal architectures of memory systems in accordance with examples as disclosed herein.

FIG. 2 illustrates an example of a process flow 200 that supports techniques to configure zonal architectures of memory systems in accordance with examples as disclosed herein. In some examples, a host system 205 and a memory system 210, which may be examples of the corresponding systems as described with reference to FIG. 1, may implement the process flow 200 using a host system controller (e.g., a host system controller 106) and a memory system controller (e.g., a memory system controller 115). In the following description of process flow 200, the operations may be performed in a different order than the order shown. For example, specific operations may also be left out of process flow 200, or other operations may be added to process flow 200.

The memory system 210 may support a zonal namespace (ZNS) architecture, which may group blocks of memory cells, or a subset thereof, of the memory system 210 into one or more zones. In some cases, a zone may include a quantity of continuous addresses, such as LBAs, associated with the memory cells corresponding to the zone. For example, a first zone may include LBAs zero through 1999, a second zone may include LBAs 2000 through 3999, and so on. A zone may be associated with any quantity of LBAs. The host system 205 may transmit commands to write data to a zone of the memory system 210 indicated by the write command (e.g., by an application associated with issuing the write command), and the memory system 210 may sequentially write data to the zone (e.g., using one or more pointers to track a last written address of each zone. As described herein, a zone may have an associated type, which may refer to a quantity of bits stored by memory cells of the zone. For example, a zone having memory cells configured as SLCs may be referred to as an SLC zone, a zone having memory cells configured as MLCs may be referred to as an MLC zone, a zone having memory cells configured as TLCs may be referred to as a TLC zone, and a zone having memory cells configured as QLCs may be referred to as a QLC zone.

Some memory systems may support a high performance mode, such as a write booster mode, which may allow a host device to write data to a zone with a relatively high performance speed, such as an SLC zone. Such memory systems may write data received from the host system to the zone, and may perform maintenance operations, such as folding or garbage collection, to periodically move data from the zone to a different zone with a lower speed performance, but a higher storage density, such as an MLC zone, a TLC zone, or a QLC zone. However, such a high performance mode may limit control of the host system, for example by not allowing the host system to control when or to where data is moved within the memory system 210.

Alternatively, the host system 205 and the memory system 210 may support a process to configure a zone of memory cells of the memory system 210 as a supported type. For example, at 215, a mapping may be communicated. For example, the memory system 210 may transmit the mapping to the host system 205. The mapping may indicate a relationship between a type of a zone and a respective quantity of available addresses (e.g., LBAs) associated with the zone configured according to the type (e.g., the mapping may indicate a storage density of a zone). In an illustrative example, the mapping may indicate that an SLC zone of the memory system 210 may be capable of storing data at a first quantity of addresses (e.g., 600 LBAs), an MLC zone of the memory system 210 may be capable of storing data at a second quantity of addresses (e.g., 1250 LBAs), a TLC zone of the memory system 210 may be capable of storing data at a third quantity of addresses (e.g., 2000 LBAs), a QLC zone of the memory system 210 may be capable of storing data at a fourth quantity of addresses, or any combination thereof. Zones can be associated with different quantities of LBAs because of the different densities of storing data. Each LBA may be associated with a fixed quantity of bits or a fixed quantity of bytes (e.g., 4k). If memory cells in a first zone are configured to store a higher quantity of bits than memory cells in a second zone, the first zone is capable of being associated with a greater quantity of LBAs.

In some examples, the memory system 210 may store the mapping in a non-volatile portion therein. For example, the mapping may be an example of metadata associated with the memory system, and may be an aspect or example of a descriptor table of the memory system 210. Accordingly, the memory system 210 may transmit the mapping to the host system 205 in response to read command from the host system (e.g., a command to read to descriptor table).

Additionally or alternatively, a manufacturer of the memory system 210 may provide a datasheet for the memory system 210, which may include the mapping or an indication thereof. For example, the datasheet may include a second mapping between relative performance speeds of a type of zone and the associated quantity of addresses (e.g., the second mapping may indicate that a first zone type having a first performance speed may be capable of storing data at the first quantity of addresses, a second zone type having a second performance speed lower than the first performance speed may be capable of storing data at the second quantity of addresses, a third zone type having a third performance speed lower than the second performance speed may be capable of storing data at the third quantity of addresses, a fourth zone type having a fourth performance speed lower than the third performance speed may be capable of storing data at the fourth quantity of addresses, or any combination thereof).

In some cases, upon receiving the mapping, the host system 205 may select a zone type of the supported zone types indicated by the mapping. Accordingly, at 220, a command may be communicated. For example, the host system 205 may transmit the command to the memory system 210. The command may instruct the memory system to configure a zone of the memory system as a type indicated by the command.

In some cases, the command may be an example of an open zone command, which may include an indication (e.g., an index, an address) of the zone to open and configure as the type. Additionally or alternatively, the command may be an example of write command, which may include an indication of the zone to store data associated with the write command. In such cases, the data associated with the command may, at 225, be communicated. For example, the host system 205 may transmit the data to the memory system 210.

The command may include a parameter, such as a set of bits, indicating the type of the zone. For example, the command may include a first set of bits (e.g., "00") to indicate an SLC zone, a second set of bits (e.g., "01") to indicate an MLC zone, a third set of bits (e.g., "10") to indicate a TLC zone, or a fourth set of bits (e.g., "11") to indicate a QLC zone.

Additionally or alternatively, the command may include a parameter indicating a relative performance speed of the zone (e.g., a performance speed as described by the mapping communicated at 215). A performance speed may refer to a speed at which the memory system 210 executes commands received from the host system 205. For example, if a host system 205 sends a write command, the speed with which the memory system 210 executes the write command may be an example of a performance speed. By way of example, the mapping may include a first performance speed, a second performance speed lower than the first performance speed, a third performance speed lower than the second performance speed, and a fourth performance speed lower than the third performance speed. Accordingly, if the parameter indicates the first performance speed, the memory system 210 may determine to configure the zone as an SLC zone, if the parameter indicates the second performance speed, the memory system 210 may determine to configure the zone as an MLC zone, if the parameter indicates the third performance speed, the memory system 210 may determine to configure the zone as a TLC zone, and if the parameter indicates the fourth performance speed, the memory system 210 may determine to configure the zone as a QLC zone.

At 230, it may be determined whether the zone is an open zone. For example, the memory system 210 may determine whether the zone has been opened (e.g., in response to a previous open zone or previous write command). If the zone has been opened, the memory system 210 may ignore the parameter included in the command, and accordingly suppress configuring the zone, and the process flow 200 may proceed to 240. Alternatively, if the memory system 210 determines that the zone is not open, the process flow 200 may proceed to 235.

In some cases, the memory system 210 may determine whether the zone is an open zone by comparing a quantity of addresses storing data to a threshold quantity of addresses of the zone to which data may be stored (e.g., a threshold quantity corresponding to the quantity indicated by the mapping for the type of the zone). If the quantity of addresses satisfies the threshold (e.g., if the quantity of addresses is less than the threshold), the memory system 210 may determine that the zone is open. For example, the memory system 210 may consider a full zone as implicitly not open (e.g., closed). Additionally or alternatively, the memory system 210 may compare a pointer of the zone, such as a pointer corresponding to a last written address of the zone, to a last available address of the zone. If the memory system 210 determines that the pointer corresponds to the last available address of the zone (e.g., if the last written address is the last available address), the memory system may determine that the zone is full, and accordingly that the zone is closed. Alternatively, because the memory system 210 may store data to the zone sequentially (e.g., using sequential addresses), if the memory system 210 determines that the pointer corresponds to an address less than the last available address, the memory system 210 may determine that the zone is open.

At 230, the zone may be configured. For example, the memory system 210 may configure the zone indicated by and in accordance with the parameter included in the command received at 220. To configure the zone, the memory system 210 may adjust one or more parameters associated with writing logic states to memory cells of the zone. For example, the memory system 210 may adjust trim parameters for the zone, such as parameters for voltage pulses applied as part of performing a write operation. Such parameters may include a timing of a voltage pulse, a duration of a voltage pulse, a shape of a voltage pulse, a magnitude of a voltage pulse, or a combination thereof. Additionally, configuring the zone may include erasing data previously stored in the zone. For example, if the command received at 220 is an open zone command, the memory system 210 may erase the memory cells of the zone, in accordance with a protocol associated with the open zone command. In some examples, as part of configuring the zone, the memory system may initialize a pointer associated with the zone to correspond to an initial address of the zone (e.g., a first available address of the zone).

At 235, data may be written to the zone. For example, if the memory system 210 configured the zone at 235 according to the type indicated by the command, the memory system 210 may write the data to zone, beginning with the initial address of the zone (e.g., the address indicated by the pointer associated with the zone). Alternatively, if the memory system 210 did not configure the zone at 235 (e.g., if the memory system 210 determined that the zone was open at 230), the memory system 210 may write the data to the zone, beginning with the last written address of the zone (e.g., the address indicated by the pointer associated with the zone). The memory system 210 may write the data in accordance with the parameters of the zone (e.g., in accordance with the type of the zone).

Such techniques may allow the host system 205 greater control over writing characteristics of the memory system 210. For example, the host system 205 may dynamically adjust the storage density of the memory system 210, for example by selecting a type for the zones of the memory system 210 in accordance with a desired storage density.

Aspects of the process flow 200 may be implemented by a controller, among other components. Additionally or alternatively, aspects of the process flow 200 may be implemented as instructions stored in memory (e.g., firmware stored in a memory coupled with a host system 205, firmware stored in a memory coupled with a memory system 210). For example, the instructions, when executed by a controller (e.g., the host system controller 106, the memory system controller 115), may cause the controller to perform the operations of the process flow 200.

Figure 3:
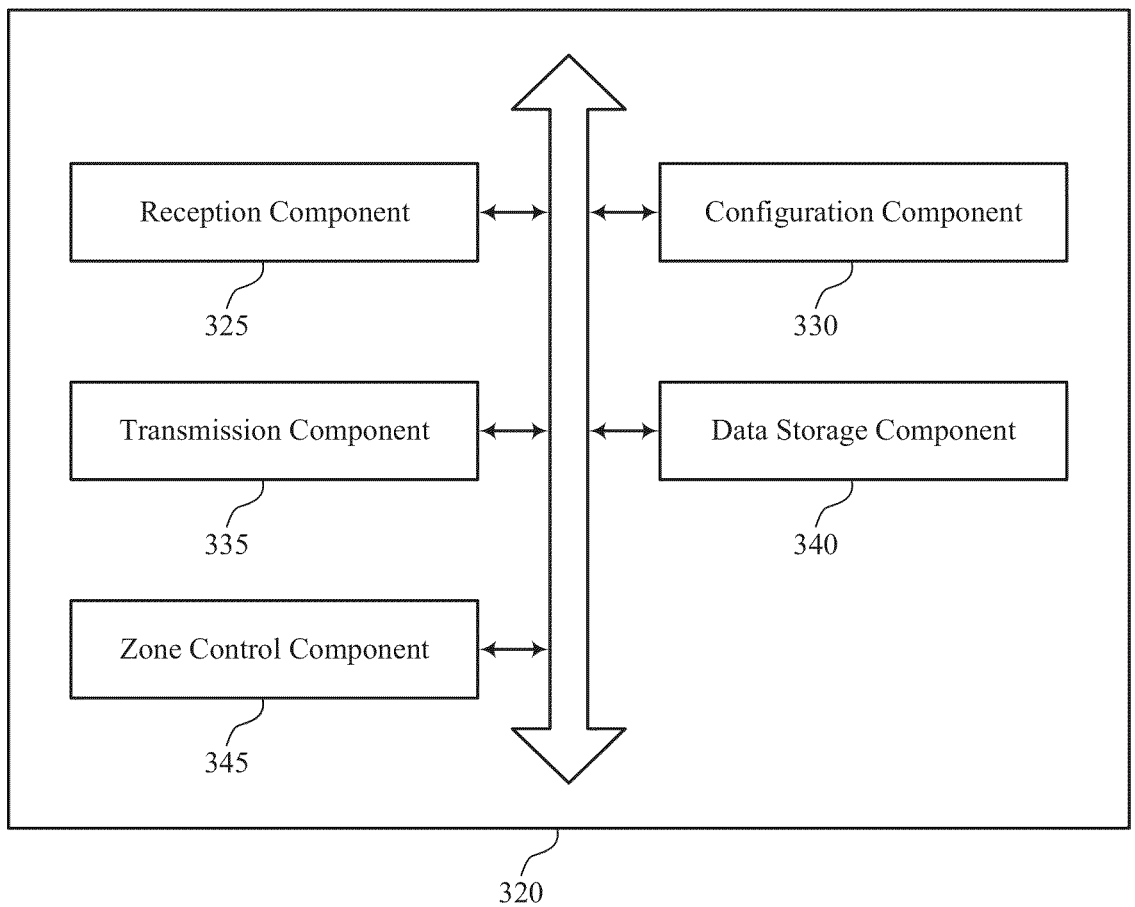
FIG. 3 illustrates a block diagram of a memory system that supports techniques to configure zonal architectures of memory systems in accordance with examples as disclosed herein.

FIG. 3 illustrates a block diagram 300 of a memory system 320 that supports techniques to configure zonal architectures of memory systems in accordance with examples as disclosed herein. The memory system 320 may be an example of aspects of a memory system as described with reference to FIGS. 1 through 2. The memory system 320, or various components thereof, may be an example of means for performing various aspects of techniques to configure zonal architectures of memory systems as described herein. For example, the memory system 320 may include a reception component 325, a configuration component 330, a transmission component 335, a data storage component 340, a zone control component 345, or any combination thereof. Each of these components may communicate, directly or indirectly, with one another (e.g., via one or more buses).

The reception component 325 may be configured as or otherwise support a means for receiving, at a memory system including a plurality of zones, a command to configure a zone of the plurality of zones, where the command includes a parameter indicating a quantity of bits of a plurality of quantities of bits to store in each memory cell of a plurality of memory cells of the zone. The configuration component 330 may be configured as or otherwise support a means for configuring the zone with one or more second parameters based at least in part on receiving the command, the one or more second parameters associated with writing a plurality of logic states to a plurality of memory cells of the zone.

In some examples, the transmission component 335 may be configured as or otherwise support a means for transmitting, from the memory system, a mapping that indicates relationships between each quantity of bits of the plurality of quantities of bits and a respective quantity of available addresses associated with the zone configured according to each quantity of bits of the plurality of quantities of bits.

In some examples, the command includes an open zone command.

In some examples, the command includes a write command.

In some examples, the reception component 325 may be configured as or otherwise support a means for receiving data associated with the write command. In some examples, the data storage component 340 may be configured as or otherwise support a means for writing the data to at least a subset of the plurality of memory cells of the zone based at least in part on configuring the zone with the one or more second parameters, each memory cell of the subset storing the indicated quantity of bits.

In some examples, the reception component 325 may be configured as or otherwise support a means for receiving a second command to write data to a second zone, the second command including a third parameter indicating a second quantity of bits. In some examples, the zone control component 345 may be configured as or otherwise support a means for determining that the second zone is an open zone. In some examples, the zone control component 345 may be configured as or otherwise support a means for suppressing configuring the zone with one or more fourth parameters based at least in part on the determining.

In some examples, the data storage component 340 may be configured as or otherwise support a means for erasing the plurality of memory cells of the zone based at least in part on receiving the command, where configuring the zone is based at least in part on erasing the plurality of memory cells of the zone.

In some examples, the parameter includes a plurality of bits indicating the quantity of bits to store in each memory cell of the plurality of memory cells of the zone.

In some examples, the one or more second parameters include a timing associated with writing the plurality of logic states to the plurality of memory cells, one or more voltages associated with writing the plurality of logic states to the plurality of memory cells, or a combination thereof.

In some examples, the reception component 325 may be configured as or otherwise support a means for receiving, at the memory system, a second command to configure a second zone of the plurality of zones, where the second command includes a third parameter indicating a speed of a plurality of speeds associated with writing data to the second zone. In some examples, the zone control component 345 may be configured as or otherwise support a means for determining a second quantity of bits of the plurality of quantities of bits corresponding to the indicated speed. In some examples, the configuration component 330 may be configured as or otherwise support a means for configuring the second zone with one or more third parameters based at least in part on the determining, the one or more third parameters associated with writing a second plurality of logic states to a plurality of memory cells of the second zone.

Figure 4:
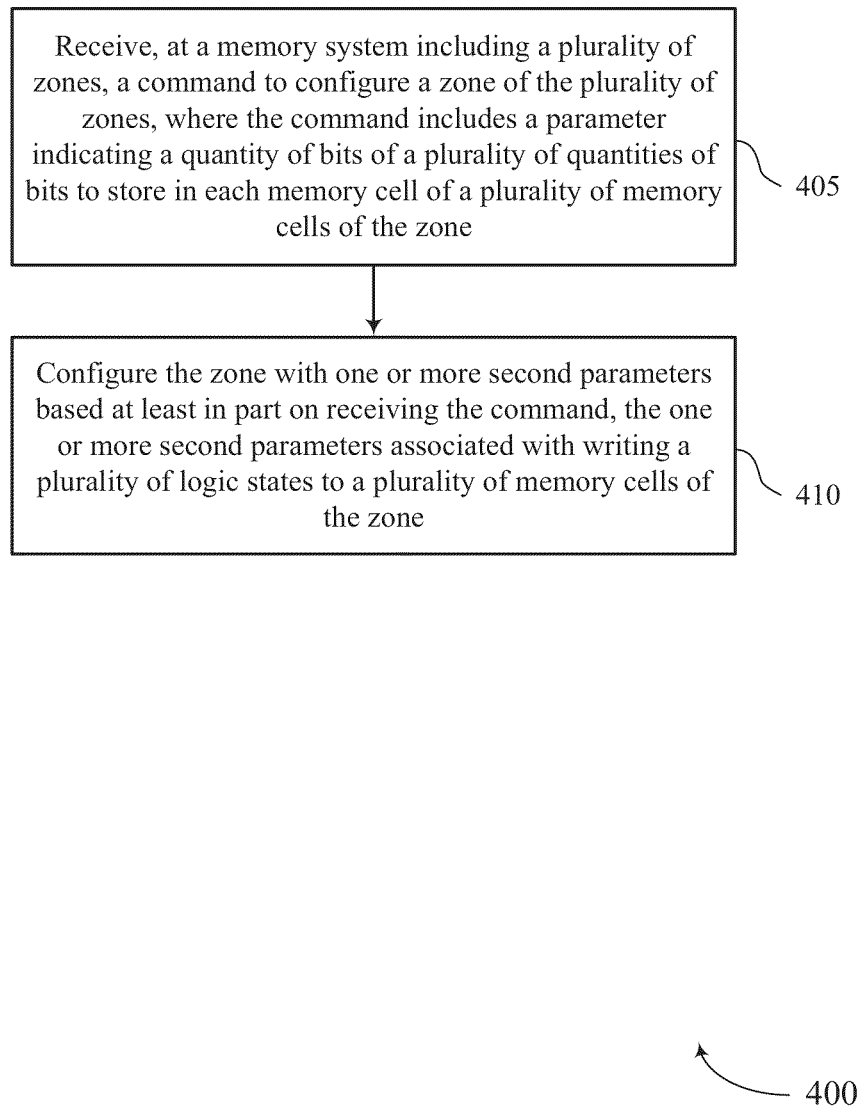
FIG. 4 illustrates a flowchart showing a method or methods that support techniques to configure zonal architectures of memory systems in accordance with examples as disclosed herein.

FIG. 4 illustrates a flowchart showing a method 400 that supports techniques to configure zonal architectures of memory systems in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include receiving, at a memory system including a plurality of zones, a command to configure a zone of the plurality of zones, where the command includes a parameter indicating a quantity of bits of a plurality of quantities of bits to store in each memory cell of a plurality of memory cells of the zone. The operations of 405 may be performed in accordance with examples as disclosed herein. In some examples, aspects of the operations of 405 may be performed by a reception component 325 as described with reference to FIG. 3.

At 410, the method may include configuring the zone with one or more second parameters based at least in part on receiving the command, the one or more second parameters associated with writing a plurality of logic states to a plurality of memory cells of the zone. The operations of 410 may be performed in accordance with examples as disclosed herein. In some examples, aspects of the operations of 410 may be performed by a configuration component 330 as described with reference to FIG. 3.

Aspects of the method 400 may be implemented by a controller, among other components. Additionally or alternatively, aspects of the method 400 may be implemented as instructions stored in memory (e.g., firmware stored in a memory coupled with a host system 105, firmware stored in a memory coupled with a memory system 110). For example, the instructions, when executed by a controller (e.g., the host system controller 106, the memory system controller 115), may cause the controller to perform the operations of the method 400.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system including a plurality of zones, a command to configure a zone of the plurality of zones, where the command includes a parameter indicating a quantity of bits of a plurality of quantities of bits to store in each memory cell of a plurality of memory cells of the zone and configuring the zone with one or more second parameters based at least in part on receiving the command, the one or more second parameters associated with writing a plurality of logic states to a plurality of memory cells of the zone.

Aspect 2: The method, apparatus, or non-transitory computer-readable medium of aspect 1, further including operations, features, circuitry, logic, means, or instructions, or any combination thereof for transmitting, from the memory system, a mapping that indicates relationships between each quantity of bits of the plurality of quantities of bits and a respective quantity of available addresses associated with the zone configured according to each quantity of bits of the plurality of quantities of bits.

Aspect 3: The method, apparatus, or non-transitory computer-readable medium of any of aspects 1 through 2, where the command includes an open zone command.

Aspect 4: The method, apparatus, or non-transitory computer-readable medium of any of aspects 1 through 3, where the command includes a write command.

Aspect 5: The method, apparatus, or non-transitory computer-readable medium of aspect 4, further including operations, features, circuitry, logic, means, or instructions, or any combination thereof for receiving data associated with the write command and writing the data to at least a subset of the plurality of memory cells of the zone based at least in part on configuring the zone with the one or more second parameters, each memory cell of the subset storing the indicated quantity of bits.

Aspect 6: The method, apparatus, or non-transitory computer-readable medium of any of aspects 4 through 5, further including operations, features, circuitry, logic, means, or instructions, or any combination thereof for receiving a second command to write data to a second zone, the second command including a third parameter indicating a second quantity of bits; determining that the second zone is an open zone; and suppressing configuring the zone with one or more fourth parameters based at least in part on the determining.

Aspect 7: The method, apparatus, or non-transitory computer-readable medium of any of aspects 1 through 6, further including operations, features, circuitry, logic, means, or instructions, or any combination thereof for erasing the plurality of memory cells of the zone based at least in part on receiving the command, where configuring the zone is based at least in part on erasing the plurality of memory cells of the zone.

Aspect 8: The method, apparatus, or non-transitory computer-readable medium of any of aspects 1 through 7, where the parameter includes a plurality of bits indicating the quantity of bits to store in each memory cell of the plurality of memory cells of the zone.

Aspect 9: The method, apparatus, or non-transitory computer-readable medium of any of aspects 1 through 8, where the one or more second parameters include a timing associated with writing the plurality of logic states to the plurality of memory cells, one or more voltages associated with writing the plurality of logic states to the plurality of memory cells, or a combination thereof.

Aspect 10: The method, apparatus, or non-transitory computer-readable medium of any of aspects 1 through 9, further including operations, features, circuitry, logic, means, or instructions, or any combination thereof for receiving, at the memory system, a second command to configure a second zone of the plurality of zones, where the second command includes a third parameter indicating a speed of a plurality of speeds associated with writing data to the second zone; determining a second quantity of bits of the plurality of quantities of bits corresponding to the indicated speed; and configuring the second zone with one or more third parameters based at least in part on the determining, the one or more third parameters associated with writing a second plurality of logic states to a plurality of memory cells of the second zone.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising: a controller associated with one or more memory devices, wherein the controller is configured to cause the apparatus to:
   transmit, from a memory system comprising a plurality of zones, a mapping that indicates relationships between one or more quantities of bits of a plurality of quantities of bits and a respective quantity of available addresses of a respective zone configured according to each quantity of bits of the plurality of quantities of bits;
   receive a command to configure a zone of the plurality of zones, wherein the command comprises a first parameter indicating a quantity of bits of the plurality of quantities of bits to store in each memory cell of a plurality of memory cells of the zone, wherein the quantity of bits indicated via the first parameter is based at least in part on the mapping; and
   configure the zone with one or more second parameters based at least in part on receiving the command, the one or more second parameters associated with writing a plurality of logic states to the plurality of memory cells of the zone.

2. The apparatus of claim 1, wherein the command comprises an open zone command.

3. The apparatus of claim 1, wherein the command comprises a write command.

4. The apparatus of claim 3, wherein the controller is further configured to cause the apparatus to:
   receive data associated with the write command; and
   write the data to at least a subset of the plurality of memory cells of the zone based at least in part on configuring the zone with the one or more second parameters, each memory cell of the subset storing the indicated quantity of bits.

5. The apparatus of claim 3, wherein the controller is further configured to cause the apparatus to:
   receive a second command to write data to a second zone, the second command comprising a third parameter indicating a second quantity of bits;
   determine that the second zone is an open zone; and
   suppress configuring the zone with one or more fourth parameters based at least in part on the determining.

6. The apparatus of claim 1, wherein the controller is further configured to cause the apparatus to:
   erase the plurality of memory cells of the zone based at least in part on receiving the command, wherein configuring the zone is based at least in part on erasing the plurality of memory cells of the zone.

7. The apparatus of claim 1, wherein the first parameter comprises a plurality of bits indicating the quantity of bits to store in each memory cell of the plurality of memory cells of the zone.

8. The apparatus of claim 1, wherein the one or more second parameters comprise a timing associated with writing the plurality of logic states to the plurality of memory cells, one or more voltages associated with writing the plurality of logic states to the plurality of memory cells, or a combination thereof.

9. The apparatus of claim 1, wherein the controller is further configured to cause the apparatus to:
   receive, at the memory system, a second command to configure a second zone of the plurality of zones, wherein the second command comprises a third parameter indicating a speed of a plurality of speeds associated with writing data to the second zone;
   determine a second quantity of bits of the plurality of quantities of bits corresponding to the indicated speed; and
   configure the second zone with one or more third parameters based at least in part on the determining, the one or more third parameters associated with writing a second plurality of logic states to a plurality of memory cells of the second zone.

10. A non-transitory computer-readable medium storing code, the code comprising instructions executable by a processor to:
    transmit, from a memory system comprising a plurality of zones, a mapping that indicates relationships between one or more quantities of bits of a plurality of quantities of bits and a respective quantity of available addresses of a respective zone configured according to each quantity of bits of the plurality of quantities of bits;
    receive a command to configure a zone of the plurality of zones, wherein the command comprises a first parameter indicating a quantity of bits of the plurality of quantities of bits to store in each memory cell of a plurality of memory cells of the zone, wherein the quantity of bits indicated via the first parameter is based at least in part on the mapping; and
    configure the zone with one or more second parameters based at least in part on receiving the command, the one or more second parameters associated with writing a plurality of logic states to the plurality of memory cells of the zone.

11. The non-transitory computer-readable medium of claim 10, wherein the command comprises an open zone command.

12. The non-transitory computer-readable medium of claim 10, wherein the command comprises a write command.

13. The non-transitory computer-readable medium of claim 12, wherein the instructions are further executable by the processor to:

receive data associated with the write command; and write the data to at least a subset of the plurality of memory cells of the zone based at least in part on configuring the zone with the one or more second parameters, each memory cell of the subset storing the indicated quantity of bits.

14. The non-transitory computer-readable medium of claim 12, wherein the instructions are further executable by the processor to:

receive a second command to write data to a second zone, the second command comprising a third parameter indicating a second quantity of bits;

determine that the second zone is an open zone; and suppress configuring the zone with one or more fourth parameters based at least in part on the determining.

15. A method, comprising:

transmitting, from a memory system comprising a plurality of zones, a mapping that indicates relationships between one or more quantities of bits of a plurality of quantities of bits and a respective quantity of available addresses of a respective zone configured according to each quantity of bits of the plurality of quantities of bits;

receiving a command to configure a zone of the plurality of zones, wherein the command comprises a first parameter indicating a quantity of bits of the plurality of quantities of bits to store in each memory cell of a plurality of memory cells of the zone, wherein the quantity of bits indicated via the first parameter is based at least in part on the mapping; and configuring the zone with one or more second parameters based at least in part on receiving the command, the one or more second parameters associated with writing a plurality of logic states to the plurality of memory cells of the zone.

16. The method of claim 15, wherein the command comprises an open zone command or a write command.

17. The method of claim 16, further comprising:

receiving data associated with the write command; and writing the data to at least a subset of the plurality of memory cells of the zone based at least in part on configuring the zone with the one or more second parameters, each memory cell of the subset storing the indicated quantity of bits.

* * * * *